United States Patent [19]

Vahlstrom et al.

[11] Patent Number: 4,651,276
[45] Date of Patent: Mar. 17, 1987

[54] COMPUTER READ NEXT INSTRUCTION SYSTEM

[75] Inventors: Richard Vahlstrom, Villa Park; Dennis R. Keats, Irvine, both of Calif.

[73] Assignee: McDonnell Douglas Corporation, Long Beach, Calif.

[21] Appl. No.: 433,022

[22] Filed: Oct. 6, 1982

[51] Int. Cl.⁴ .............................................. G06F 9/30
[52] U.S. Cl. .................................................. 364/200
[58] Field of Search ... 364/200 MS File, 900 MS File

[56] References Cited

U.S. PATENT DOCUMENTS 4,177,514  12/1979  Rupp .................................... 364/200
4,325,118  4/1982  DeVita et al. ........................ 364/200

*Primary Examiner*—Thomas M. Heckler
*Attorney, Agent, or Firm*—Gregory A. Cone; George W. Finch; Donald L. Royer

[57] ABSTRACT

This read next instruction system (RNI) fetches and parses multi-byte instruction streams by means of a picoprocessor subsystem in conjunction with a state machine controller. These controllers cause the input data, which constitutes software instructions, to be parsed into a plurality of first rank instruction registers. Upon reception of an appropriate command from the main CPU system, the information contained in the first rank registers is transferred into second rank instruction registers. Then the RNI system continues to parse more data which replaces the transferred data in the first rank instruction registers. The data in the second rank instruction registers is used directly by the main CPU for the following functions: map branching and conditional branching based on OP codes and sup OP codes; address computation based on address register and displacement information; use of literals for test masks and software branch address; and determination of word length.

3 Claims, 15 Drawing Figures

COMPUTER READ NEXT INSTRUCTION SYSTEM

BACKGROUND OF THE INVENTION

This invention relates to read next instruction systems (RNI) utilized in computer systems.

Most modern high-speed computer systems employ some type of system to fetch and parse information prior to its processing by the arithmetic logic unit (ALU) of the computer system in order to minimize processing time. Such systems reorganize the information which will be input into the ALU into a form which is more or less directly usable by the ALU. This has important time saving advantages because the ALU will be able to minimize its time spent fetching and decoding instructions.

The design of a particular such preprocessing system or read next instruction (RNI) system will depend in large part upon the particular computer system in which it is utilized. Computer systems which are intended for use in scientific applications generally have rather straightforward and consistent instruction sets which in most cases do not require a complicated RNI system. Business computer systems, on the other hand, normally emphasize file handling capability and often have fairly complicated instruction sets which in turn require a more complex RNI system.

SUMMARY OF THE INVENTION

The function of the RNI system of this invention is the fetching from memory of an instruction stream and the reorganizing or parsing of this instruction into a controlled, well ordered function for subsequent execution by the main processor of the computer system. The logic implementing this function comprises a picoprocessor sequencer, control store, memory fetch and instruction register control logic, memory data register, program address registers, double ranked instruction registers, and instruction mapping programmable read only memories (PROM's).

This RNI system comprises input means to supply the RNI system with multi-byte instruction streams, picoprocessor means to parse the input bytes and provide system control commands, RNI state controller means receiving inputs from the picoprocessor and controller outputs, first rank instruction register means to hold the parsed instruction string which is loaded from the input means under the control of command signals from the picoprocessor and the state controller, second rank instruction register means to hold the parsed instruction string which is loaded from the first rank instruction means under the control of the command signals, and output means to supply the parsed instruction string from the second rank instruction register means to the computer system.

DETAILED DESCRIPTION OF THE INVENTION

The read next instruction system of this invention was developed as a subsystem of the SEQUEL TM computer system recently introduced by Microdata Corporation, Irvine, Calif. The SEQUEL system is a large business computer system which is designed around the use of 32-bit (4-byte) data words and the use of data and instructions which range in length from 1 to 6 bytes plus the use of indefinitely long data strings. The remarks that follow will describe the implementation of the read next instruction system within the context of this SEQUEL system. However, it should be realized that other embodiments of the basic invention are possible and that the true scope of the invention is defined by the appended claims.

Figure 1:
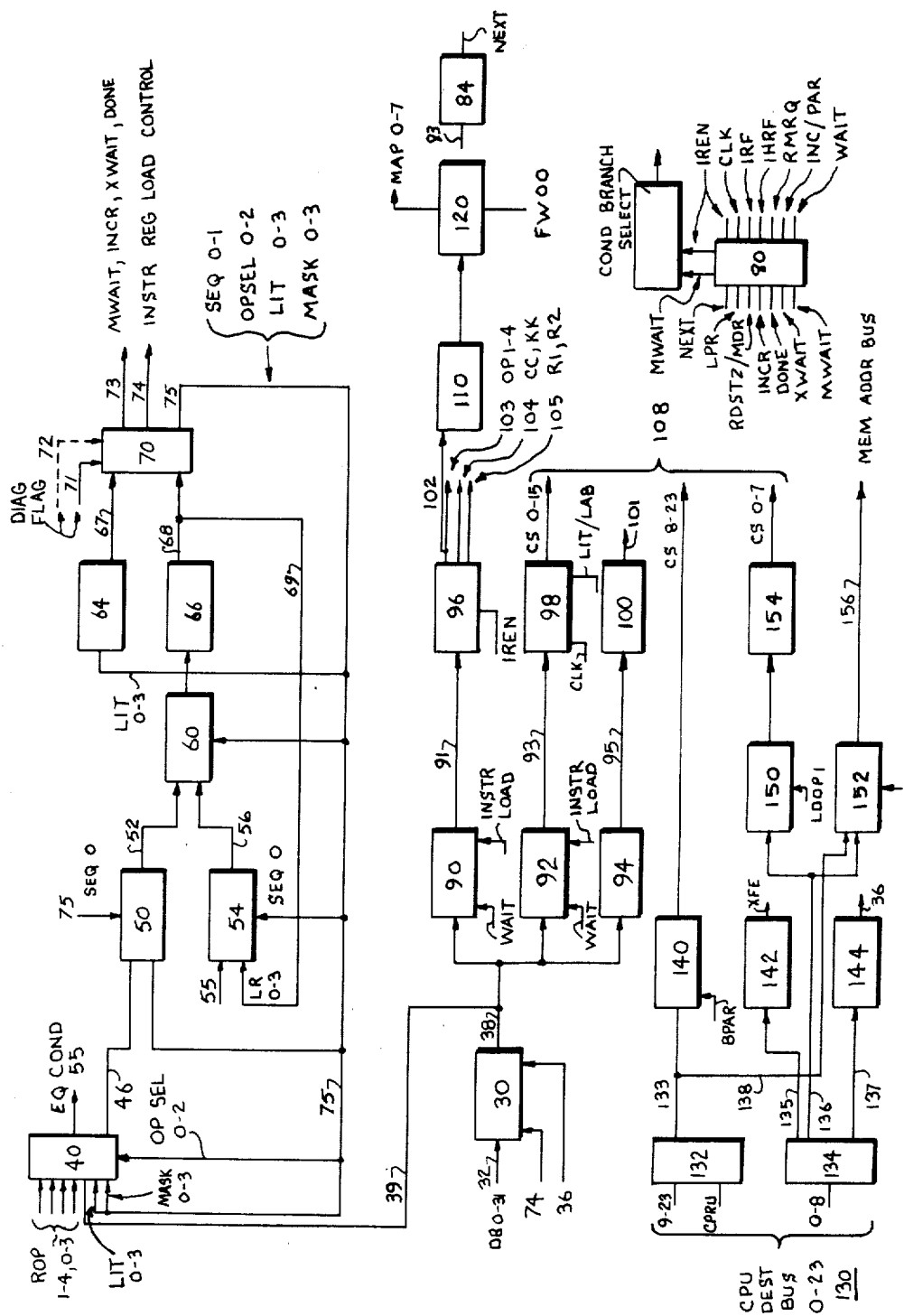
FIG. 1 is a functional block diagram of the overall layout of one embodiment of the RNI system of this invention.

The control store of the RNI system consists of 1,024 32-bit words of read only memory. Since the picoprocessor sequencer address register can address only 256 words, the control store appears as four separate files. The control store is shown in FIG. 1 as block 70. Of these four separate files, one contains the normal system RNI firmware and three contain diagnostic or other RNI firmware. Each 32-bit control store firmware word consists of a 4-bit field used for overall control, shown as output line 73, a 12-bit field used for instruction register loading, shown as output line 74, a 13-bit field used for sequencer control, shown as output line 75, and a 3-bit field which is presently unused. The sequencer control field can be classified into four sub fields: sequencer operation field, operand selection field, literal field, and mask field. The sequencer operation field specifies the type of branch or skip to be executed. The operand selection field is used to select a particular operand holding register (OP1, OP2, OP3, OP4, R1, or R2) or the upper or lower half of the internal RNI bus 38 in FIG. 1 for testing. In the SEQUEL sytem, R1 and R2 are implemented in the OP-code selection but are presently not used. If the sequencer operation field contains the bits 0 0, the operation performed will be an unconditional jump. The upper 4 bits of the jump address are taken from the literal field. The lower 4 bits are taken from the mask field. If the sequencer operation field contains the bits 0 1, the operation performed is a vectored jump. The upper 4 jumps of the jump address are taken from the literal field. The lower 4 bits are derived from the logical AND of the mask field and the selected operand. This operation performs what is called a table jump.

If the sequencer operation field contains the bits 1 0 or 1 1, the operation performed is a skip if equal or skip if not equal, respectively. The upper 4 bits of the next address are unchanged from those of the current control store address. If the skip condition is not met, the lower 4 bits of the current address with 1 added become the next address. If the skip condition is met, the lower 4 bits of the current address are incremented by 2. Only the lower 4 bits are affected by the skip operation under any circumstances. The equal condition is determined by a bit for bit comparison between the selected operand and the literal field. The mask field selects which combination of the 4 comparisons are used to determine a composite equal condition. For example, if the mask field were 0 0 1 1, only the lower 2 bits of the selected operand and of the literal would be compared for equality.

The memory fetch and control logic are shown in FIG. 1 as block 80 and may also be called the RNI state machine. This control logic provides for communication with the memory system and with the main processor. When either a system reset or RNI reset occurs, this logic is initiallized. This logic consists of memory interface control, RNI sequencer hold control, and main processor interface control.

The control signals involved with memory interface are the RNI memory request (RMRQ), the RNI memory data strobe (RDST) and the increment signal from the RNI control store (INCR). When the RNI unit is initiated, a memory request is made which is removed when the data strobe is returned. The data strobe also causes a 2-bit use counter to reset. The INCR signal increments the use counter to indicate the number bytes of the memory data word that have been processed. A memory request is made when the use count reaches 3 and the INCR signal is asserted. Data ready is reset at this time also to indicate that a memory cycle must be completed before additional data may be processed. The INCR signal is also used to generate INCPAR which causes the RNI program address register to increment.

There are a variety of instruction register control signals. There is a status associated with each rank of the instruction register. These are instruction holding registers full (IHRF) for the first rank and instruction registers full (IRF) for the second rank. Two control signals, instruction register load enable (IREN) and instruction register load clock (IRCLK) are used to control the transfer of data from the first rank to the second rank. The control signal is decoded from the main processor command to initiate a transfer into the second rank. The DONE control signal from the RNI control store initiates a transfer into the first rank. Upon initialization, both IRF and IHRF are reset. The first DONE after this will cause the transfer of data from the first rank to the second rank and set IRF. If this is followed by a NEXT command, IRF will be reset; if followed by a simultaneous NEXT and DONE, the transfer between instruction register ranks is carried out and no status changes. If IRF and IHRF are both reset, NEXT should never occur, but will be ignored if it does. If IRF and IHRF are both set, DONE should never occur, but will be ignored if it does.

RNI sequence hold control signals are described in this paragraph. During memory cycles when data is not yet available and when both ranks of the instruction register are filled, that is, there is nowhere to place data, RNI processing cannot proceed. To control this, a signal called WAIT is generated. The XWAIT term from the control store 70 causes the WAIT state if the IHRF is set, that is, processing cannot continue until the main processor completes execution of the current instruction and either requests the next instruction or loads the RPAR. The MWAIT term from the control store causes the WAIT state if signal DR is reset. DR is a control signal indicating the status of the RNI memory activity, standing for data ready. The MWAIT term holds processing until the memory data register is filled.

The main processor interface control signals consist of four signals: NEXT, LPR (or LPAR), DIRF, and ACTV. NEXT and LPR originate in the main processor. The DIRF signal orginates in the instruction register control logic block 80 of FIG. 1 and causes the IHRF status signal to be delayed one clock cycle. The ACTV signal originates from the RNI system.

The main processor should never assert NEXT without first assuring that DIRF is set. The LPR signal causes the contents of the CPU destination bus shown as 130 in FIG. 1 to be entered into the RNI program address register and also causes the intialization of the RNI picoprocessor. Because of this, it is imperative that no RNI memory cycle be in progress when the main processor asserts LPR. To ensure this, the ACTV signal must be tested by the main processor. The signal is high either if DR is reset (a memory request is being made) or if IHRF is reset (which indicates the RNI is processing the next instruction and could initiate a memory cycle before the main processor can assert LPR).

The various combinations of the signals DR, IRF, IHRF, and ACTV cause a variety of different states in the RNI system. The table below lists these various combinations, assigns a state number, and briefly describes each state.

TABLE 1

| STATE | DR | IRF | IHRF | ACTV | DESCRIPTION |
|-------|----|----|------|------|-------------|
| 0 | 0 | 0 | 0 | 1 | Initial parse (to begin) |
| 1 | 0 | 0 | 1 | 1 | Unusual state |
| 2 | 0 | 1 | 0 | 1 | Second parse (to begin) |
| 3 | 0 | 1 | 1 | 1 | Memory cycle for third parse |
| 4 | 1 | 0 | 0 | 1 | Initial parse (in progress) |
| 5 | 1 | 0 | 1 | 0 | Unusual state |
| 6 | 1 | 1 | 0 | 1 | Second parse (in progress) |
| 7 | 1 | 1 | 1 | 0 | Two parses complete, memory cycle complete for third parse |

State 0 is the initial state in which no instructions have been completely processed and RNI is waiting on a memory cycle to complete. State 1 should never occur in proper operation but will be handled correctly. In this state the instruction holding register is full, but the instruction register is empty. State 2 is the condition where one instruction has been completely processed and RNI is waiting on a memory cycle before continuing with the processing of a second instruction. In state 3, two instructions have been fully processed while the memory cycle is in progress because the second of these instructions used the last byte of the data memory register. In state 4 RNI is processing an initial instruction. The main processor is waiting for an instruction at this time. State 5 is similar to state 1. In state 6, RNI is processing an instruction to follow the one already in the instruction register. In state 7, all registers are filled and RNI is inactive, waiting for either a NEXT request or initialization.

In the SEQUEL system, the main processor must execute the following steps to properly interact with the RNI subsystem.

1. Wait for an instruction register full (IRF) to be set.
2. Allow for propagation delay through the mapping PROM's.
3. Execute the instruction.
4. Request the next instruction NEXT, and go to step 1 if it is not a branch instruction.
5. If it is a branch instruction, wait for RNI to become inactive (ACTV/is set).
6. Load RPAR.
7. Go to step 1.

The memory data register which loaded 4 bytes at a time from memory during instruction fetch and is a 32-bit register which is accessed 1 byte at a time by the RNI system. This register is shown as block 30 in FIG. 1 having data inputs from the system data bus labelled as line 32. The register is loaded from the memory data bus when an RNI data strobe RDST occurs, signalling the completion of a memory cycle. The lower 2 bits of the RPAR are used to sequencially select one of the 4 bytes of memory data to be enabled onto the RNI bus. The read next instruction program address registers are shown as blocks 132 and 134 in FIG. 1. The lower 2 bytes are found in block 134 and are transferred via line 137 into the lower bit decoder block 144 which outputs an instruction byte select signal labelled as RRS 0–3 which is input into block 30 over line 36.

There are three ranks of program address registers. Since program execution is restricted to 512-byte frames, the upper 15 bits of all program address registers are always the same, requiring only one 15-bit register for all ranks with 9-bit registers representing each rank. The 15-bit upper program address register is shown as block 132 having as its input lines 9–23 which are the 15 upper bits of the CPU destination bus. Block 132 has as its outputs lines 133 and 138. Line 133 feeds into the CPU source bus drivers 140 which output onto the CPU source bus 108. Line 138 feeds into the memory address bus drivers in block 152 for output onto the memory address bus via line 156. The three ranks of the lower 9-bit program address registers are shown as blocks 134, the lower program address register, block 150, the H PAR register, and block 154, the B PAR register, which eventually outputs onto the CPU source bus over lines CS 0–8. The first rank is the RNI program address register, or RPAR. This register is loaded by the main processor to affect a software branch. Loading this register causes intialization of RNI. The RPAR provides the memory address for all RNI memory cycles. As each byte of the memory data is referenced, the RPAR is incremented under control of the INCPAR signal, which is in turn controlled by INCR from the control store. When all 4 bytes of the memory data register have been processed, the RPAR then points to the next word in memory. Since memory words accessed by RNI do not necessarily lie on double word boundaries, the lower 2 bits of the RPAR are decoded to select one of the 4 bytes of memory data as the RPAR is incremented. This allowes for sequential access of bytes for processing. This decoding operation is, again, performed in block 144 and output over lines RRS 0–3 which feed into the memory data read register 30.

At the start of processing for each execution, the OP1 register in block 90 is loaded. Block 90 is a portion of the first rank instruction holding registers. At this time the contents of the RPAR are transferred into the holding program address register or H PAR. The H PAR is considered one of the instruction holding registers since it contains the starting address of the instruction in this first ranks of instruction registers. When the instruction holding registers are tranferred into the instruction registers, the second rank registers, the HPAR is transferred to the backup program address register or BPAR. The contents of the BPAR are provided for allowing the main processor to return to the current instruction if an interrupt condition exists, for example, frame fault condition or external interrupt condition.

The instruction register is actually a double ranked set of several registers, each of which has a specific purpose oriented toward the instructin set utilized in the SEQUEL system. The first rank of registers is loaded from the memory data register 30 from the RNI bus 38 under control of the RNI firmware. A 12-bit field from the control store via line 74 specifies the particular combination of registers to be loaded. The second rank of registers is loaded from the first rank under the control of the instruction register control logic in block 80 of FIG. 1. Four of the registers in the second rank feed a set of PROM's which provide OP code branch addresses to the main processor microsequencer. These PROM's are found in block 110. The second rank registers are found in blocks 96, 98 and 100, while the first rank registers are found in blocks 90, 92 and 94. The 110 block contains the mapping PROM's, the output of which feeds into a select block 120 which outputs 8 mapping bits, MAP 0–7. The four registers in block 96 which feed into the mapping PROM's are the OP code registers. Four other registers in the second rank are routed to the address computation portion of the main processor. These are the R1 and R2 registers found in blocks 96 and the DSP1 and DSP2 registers found in block 100. These registers have corresponding first rank registers in blocks 90 and 94 respectively. The address computation subsystem forms the subject matter for another patent application assigned to the assignee of this invention. The remaining outputs from the second rank instruction register block 96 are fed to various parts of the microprocessor and will be discussed below.

The loading of the OP code registers in block 90 is controlled by 5 bits from the control store in block 70 which are used to control loading of the OP1, OP2, OP3 and OP4 registers. Four of these bits individually correspond to each of the registers. The fifth bit selects either the upper or lower 4 bits of the RNI bus for loading into OP4. The OP1 register is loaded from the upper 4 bits of the RNI bus. This is always the primary OP code in the SEQUEL system which always found in the first byte of the instruction. Additional functions are formed when this register is loaded. The RPAR is transferred to the HPAR, and the KK register (an operand length specifier) is reset to 0's. The OP2 register is loaded from the upper 4 bits of the RNI bus, the OP 3 register is loaded from the lower 4 bits of the RNI bus. The OP4 register is loaded from the upper 4 bits if the upper/lower select bit (UL4) is a 1; from the lower 4 bits if the (UL4) is a 0. The OP2, 3 and 4 registers contained secondary OP codes. The four OP code registers of the first rank are used in the picoprocessor sequencer for testing and sequence control. This allows the RNI firmware program to make decisions based on the primary and secondary OP codes of an instruction about the length of the instruction and the organization of fields in the instruction. The four OP code registers of the second rank go to the instruction mapping PROM's in block 110. One of these PROM's is the primary map and uses OP1 and OP4 to generate a branch address for the microsequenser. OP1 and OP4 also are used by another PROM to select which of two additional secondary map PROM's is the selected PROM for the secondary map branch address. The combination of either OP2 and OP3 or OP3 and OP4 is used to generate the secondary map.

There are four pairs of registers which contain data intended exclusively for the separate address computation subsystem. These registers are the R1, R2, DSP1 and DSP2 registers found in the first and second rank blocks 90, 94, 96 and 100. In addition, the KK register, also found in blocks 90 and 96, is used by the address computation system. The R1 and R2 registers each contain 4 bits. R is always loaded from the lower 4 bits of the RNI bus. $R_2$ can be loaded from either the upper or lower 4 bits of the RNI bus as determined by the upper/or lower select bit (UL4) from the control store in block 70. The definition of this bit is inverted from its meaning for the loading of OP4, that is, the upper 4 bits are selected if UL4 is a 0, the lower 4 bits if UL4 is a 1. The DSP1 and DSP2 registers are each eight bits. They are loaded directly from the RNI bus. There are not individual bits for load control of these registers as there are for the OP code registers. Instead, three bits from the control store are decoded to select one of seven combinations of registers to be loaded. The seven choices, not including the choice of no registers, are: R1 only, R2 only, R1 and R2, DSP1 only, DSP2 only, CC only, or R2 and CC.

There are five pairs of registers which are used by various components of the main processor. These registers are referred to as the label, literal, KK, CC and PAR registers. The KK and CC registers have been briefly mentioned above. The PAR registers are the program address registers which have been described above. Associated with the program registers is a status bit called FRMX which is passed on to the branch condition multiplexer in the microsequencer. This bit is set if the instruction in the second rank does not fit in the current program frame; that is, an attempt was made to execute across a frame boundary. The KK register is 2 bits which are loaded from bits 7 and 6 and the RNI bus. The KK register is also cleared when OP1 is loaded. The contents of the KK register represent the operand word length —1, 2, 4 or 6 bytes. It is passed to and used by address computation, rotate and the branch condition logic. The rotate subsystem forms the basis for an additional patent application which also assigned to the assignee of this invention. One bit from the control store controls loading of KK. The CC register is 2 bits which are loaded from bits 3 and 2 of the RNI bus. The contents of CC represent the condition to be tested by the ALU for conditional branch software instructions. The 2 bits of CC are individually available as microsequencer branch conditions. Load control of CC is decoded as described previously. The label register is 16 bits wide. It is divided into two single byte registers (LABELU and LABELL), each of which may be directly loaded from the RNI bus. Each byte has a corresponding control bit in the control store. A label register is used to pass instruction fields more than 8 bits in length to the ALU, for instance, branch addresses. The entire 16-bit reigister can be selected by the ALU as an external source. The literal (LIT) register contains 8 bits which are loaded directly fromt the RNI bus. One bit from the control store is used to load this register. The LIT register is used to pass 1-byte literal fields from instructions to the ALU; for instance, character scan masks. The character scan masks are used in a character testing system which forms the basis for an additional patent application also assigned to the assignee of this invention. The LIT register is an external source for the ALU.

The output firmware word from the RNI control store in block 70 is a 32-bit word, the significance of each bit being explained below. Bit 31 produced the MWAIT signal, which is the memory wait signal. This means that no portion of the current instruction is completed until data has been strobed into the memory data register and is available on the RNI bus. This must be specified in any RNI instruction which loads a register or tests the RNI bus. Bit 30 outputs the INCR signal which causes the RPAR to increment. This means that the next byte of the instruction stream in the memory data register is to be selected for the next instruction. This indicates that processing of the current byte on the RNI bus will be completed with the current RNI instruction. Bit 29 produces the XWAIT signal which indicates execution wait. This means that no portion of the current instruction is executed until the instruction holding register is transferred to the instruction register. This must be specified as the first step of processing before any changes are made to the instruction holding register. Bit 28 outputs the DONE signal which indicates processing done. The processing for the current software instruction holding register is complete and the instruction holding register is now full. No registers can be loaded on the same RNI instruction if DONE is indicated. This is the last operation to be executed for each software instruction.

Bits 27, 26, 25 and 24 produce OPL signals which control the loading of the OP code registers. Bit 27 controls OP1, clearing of KK, and loading of HBAR. Bits 26, 25 and 24 contol OP2, OP3 and OP4 respectively. Bit 23 is the UL4 signal which is the upper/lower nibble select signal. If a 0 is output on this bit, OP4 would be loaded from the lower 4 bits of the RNI bus and R2 would be loaded from the upper 4 bits of the RNI bus. If this bit is a 1, OP4 would be loaded from the upper 4 bits and R2 from the lower 4 bits. This is a select control only, load control is defined by other bits. Bits 22, 21 and 20 are the LRDC bits which control loading of the R1 and 2, the SP1 and 2 and CC registers. These registers are loaded according to the following matrix.

| 23 | 22 | 21 | FUNCTION |
|---|---|---|---|
| 0 | 0 | 0 | None |
| 0 | 0 | 1 | R1 only |
| 0 | 1 | 0 | R2 only |
| 0 | 1 | 1 | R1 and R2 |
| 1 | 0 | 0 | DSP1 only |
| 1 | 0 | 1 | DSP2 only |
| 1 | 1 | 0 | CC only |
| 1 | 1 | 1 | R2 and CC |

Bits, 19, 18, and 17 are the LL bits which control the loading of the literal and label registers. Bit 19 controls LIT. Bit 18 controls LABELU (the upper label register) and bit 17 controls LABELL (the lower label register). Bit 16 is the LK signal which controls loading of the KK register. Bits 15 and 14 outputs SEQ signal, which is a sequence instruction signal which defines the type of sequence operation to be executed as follows:

| 15 | 14 | FUNCTION |
|---|---|---|
| 0 | 0 | Jump to address and LIT and mask fields |
| 0 | 1 | Vector to mapped address |
| 1 | 0 | Skip if selected operand (with mask) equals LIT |
| 1 | 1 | Skip if selected operand (with mask) does not equal LIT |

Bits 13, 12 and 11 produce the OP SEL signal which is the operand select signal. These bits are used to select one of eight choices of operands for use in condition testing (skips) or vectoring. They are defined as follows:

| 13 | 12 | 11 | FUNCTION |
|---|---|---|---|
| 0 | 0 | 0 | Upper 4 bits of RNI bus |
| 0 | 0 | 1 | OP1 |

| 13 | 12 | 11 | FUNCTION |
|---|---|---|---|
| 0 | 1 | 0 | OP2 |
| 0 | 1 | 1 | OP3 |
| 1 | 0 | 0 | OP4 |
| 1 | 0 | 1 | Lower 4 bits of RNI bus |
| 1 | 1 | 0 | R2 |
| 1 | 1 | 1 | R1 |

Bits 10, 9, 8 and 7 are the LIT bits which control the literal field. This field is used for the upper 4 bits of a jump or vector address and for comparison with the selected operand for skip tests. Bits 6, 5, 4, and 3 are the mask field bits. This field is used in the comparison of skip tests, for masking a selected operand for vectoring, or for the lower 4 bits of a jump address. Bits 2, 1, and 0 are not used.

Figure 2:
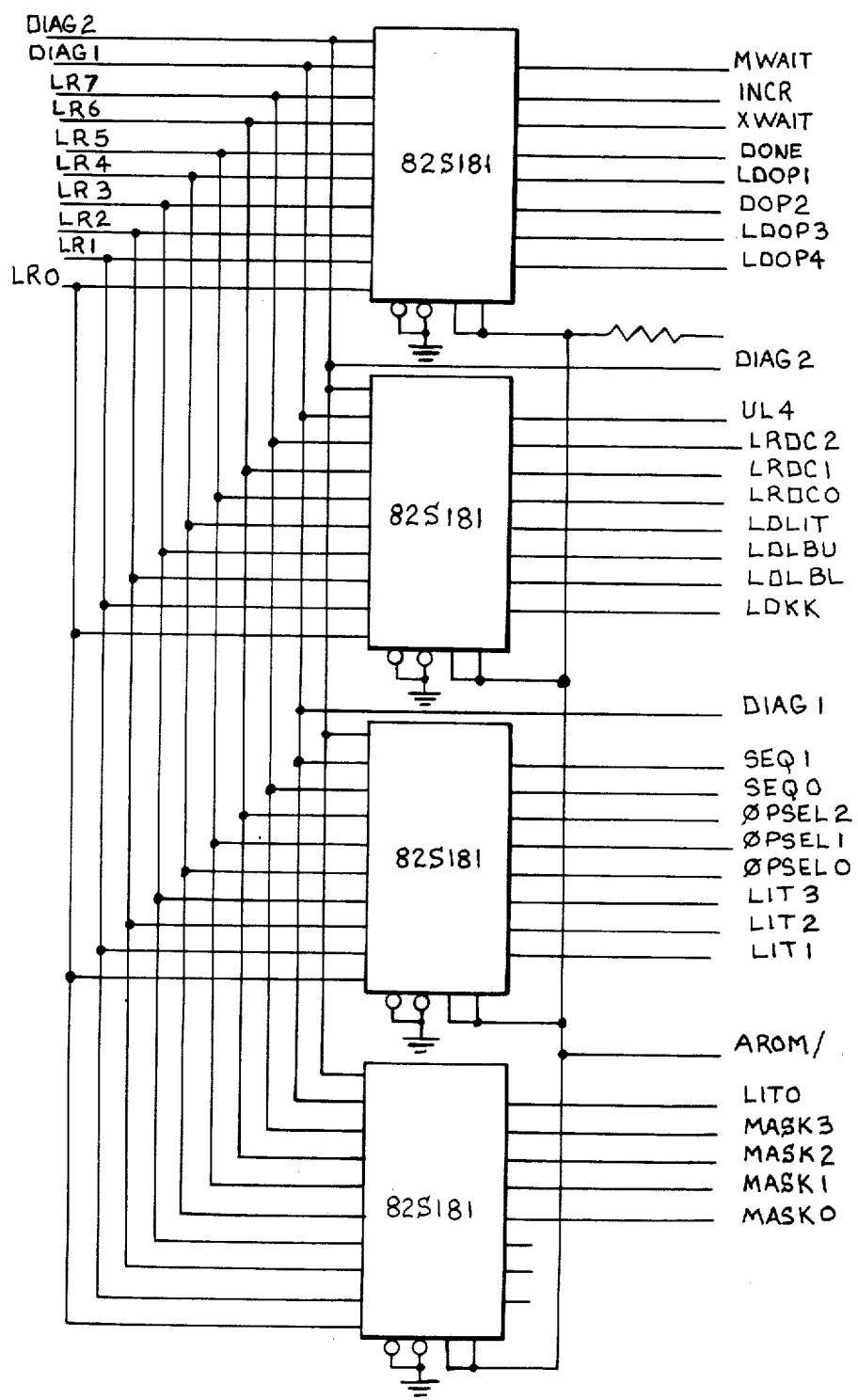
FIGS. 2-15 are detailed schematic diagrams of various portions of the overall RNI system shown in FIG. 1.

FIG. 2 is a detailed schematic diagram of the RNI control store or picoprocessor firmware ROM's shown as block 70 in FIG. 1. The input lines are the two diagnostic lines, DIAG 1 and 2, and eight picoprocessor firmware address lines, LR 0–7. With the exceptions DIAG 1 and 2 and AROM/, the output lines from this block comprise the picoprocessor firmware word which has been described above in the context of the RNI control store information format. The MWAIT term corresponds to bit 31, the INCR term corresponds to bit 30, the XWAIT term corresponds to bit 29, the DONE term corresponds to bit 28, the LDOP 1–4 terms correspond to bits 27–24, the UL4 term corresponds to bit 23, the LRDC 2–0 terms correspond to bits 22–20, The LDLIT term corresponds to bit 19, the LDLBU term corresponds to bit 18, the LDLBL corresponds to bit 17, and the LDKK term corresponds to bit 16. Terms SEQ1-0 correspond to bits 15–14, terms OPSEL2-1 correspond to bits 13–11, the LIT3-0 terms correspond to bits 10–7, and the MASK 3-0 terms correspond to firmware bits 6–3. Again, bits 2, 1 and 0 are not used in the firmware word from the picoprocessor.

Figure 3:
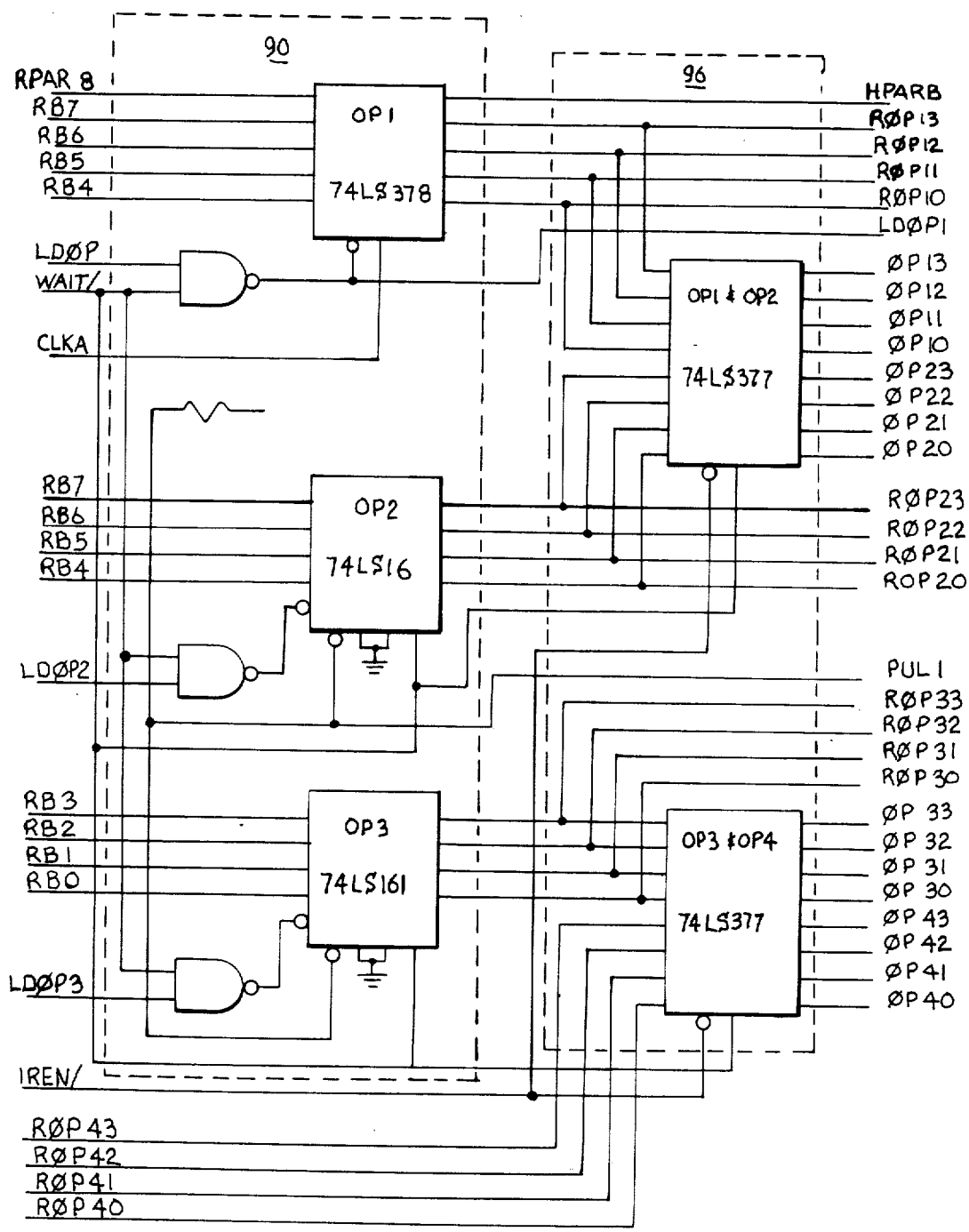

FIG. 3 shows the detailed schematic diagram for blocks 90 and 96 of FIG. 1 which are the first and second rank instruction registers. The inputs to the first rank instruction registers include lines RPAR 8 which originates from the lower program address register shown in FIG. 10. The RB7–0 lines are the lines of the RNI parsing bus. The CLK line is a clock line. FIG. 3 shows only the registers for OP1, OP2 and OP3. The register for OP4 is found on FIG. 4 to be discussed below. The outputs from the first rank instruction registers in FIG. 3 feed into the two second rank instruction registers shown in FIG. 3. The upper register handles OP1 and OP2, while the lower register handles OP3 and OP4. One output is line HPAR8 which feeds into the second rank instruction shown in FIG. 5 which is a portion of block 96. The ROP1 3–1 lines feed into that portion of block 40 shown on FIG. 12. Line ROP 1 0 feeds into another portion of block 40 shown in FIG. 13. Similarly, lines ROP2 3–1, and lines ROP3 3–1 feed into block 40 on FIG. 12, with lines ROP2 0 and ROP3 0 feeding into the other portion of block 40 shown in FIG. 13. All of the OP prefixed output lines feed into the various mapping PROM's in block 110 shown in FIG. 15.

Figure 4:
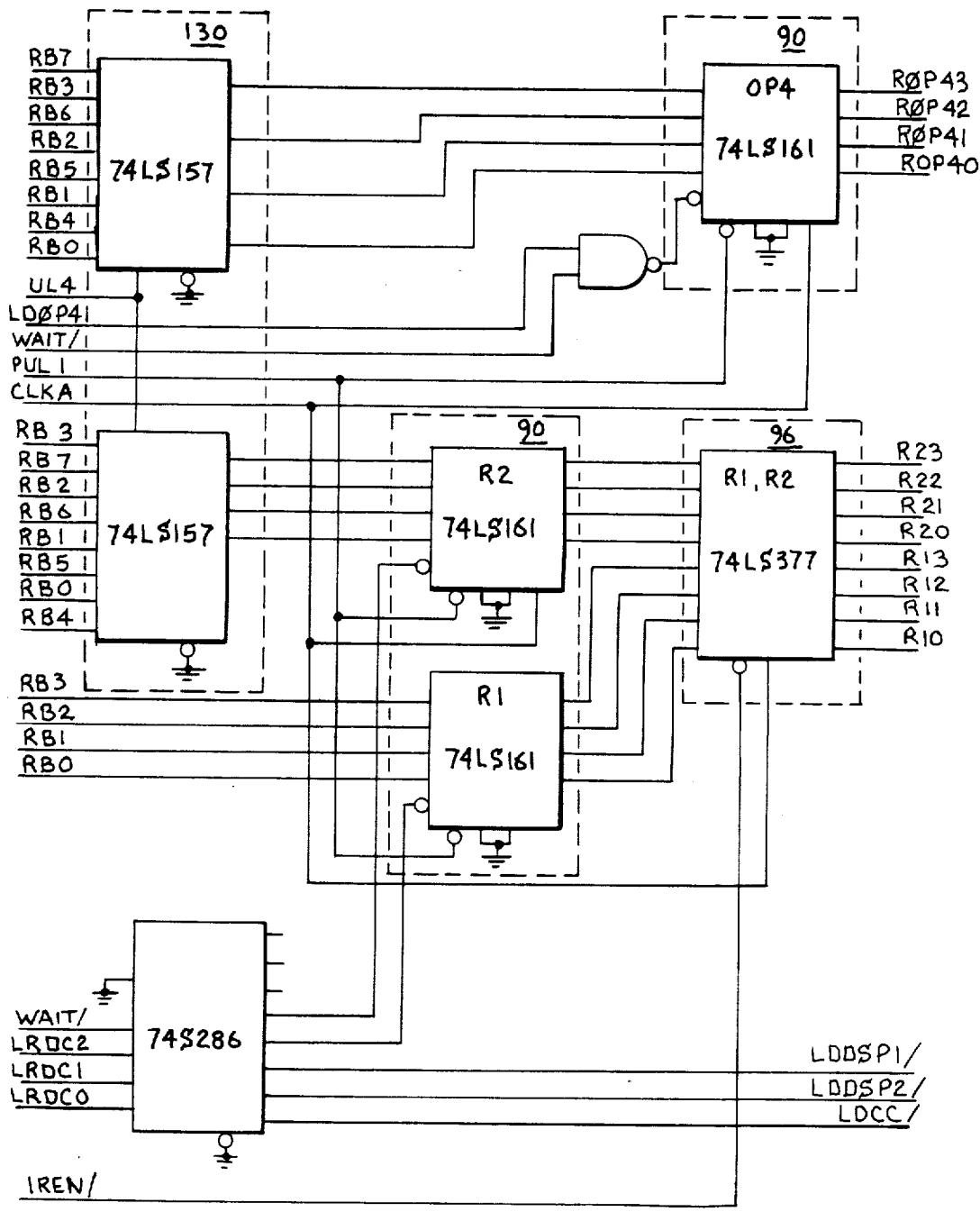

FIG. 4 shows portions of block 90, block 96 and block 144. The inputs to this block have already been described. The two chips (74LS157's) in the upper left portion of this figure are not shown in FIG. 1 and represent the nibble selection multiplexer for R2 and OP4 discussed briefly above. The 74LS1561 chip in the upper right portion of the figure is a portion of block 90 which is the first rank instruction register for OP4. The two 74LS161 chips shown in the middle of this figure are the first rank instruction registers for R2 and R1. The 74LS377 chip is that portion of block 96 from FIG. 1 which is the second rank instruction for R2 and R1. The 74S288 chip shown in of FIG. 4 is the picoprocessor decoder for load enables which produces output signals LDDSP1 and 2 and LDCC which control the loading of DSP1, DSP2 and CC in FIGS. 7 and 5. This chip is associated with block 144 in FIG. 1. The inputs to FIG. 4 have all been discussed previously. The outputs are lines ROP4 3–1 which feed into the portion of the 40 block shown in FIG. 12 with line ROP4 0 feeding into that portion of block 40 shown in FIG. 13. The output lines R2 3–1 and R1 3–1 also feed into that portion of block 40 shown in FIG. 12, with lines R2 0 and R1 0 feeding into that portion of block 40 shown in FIG. 13.

Figure 5:
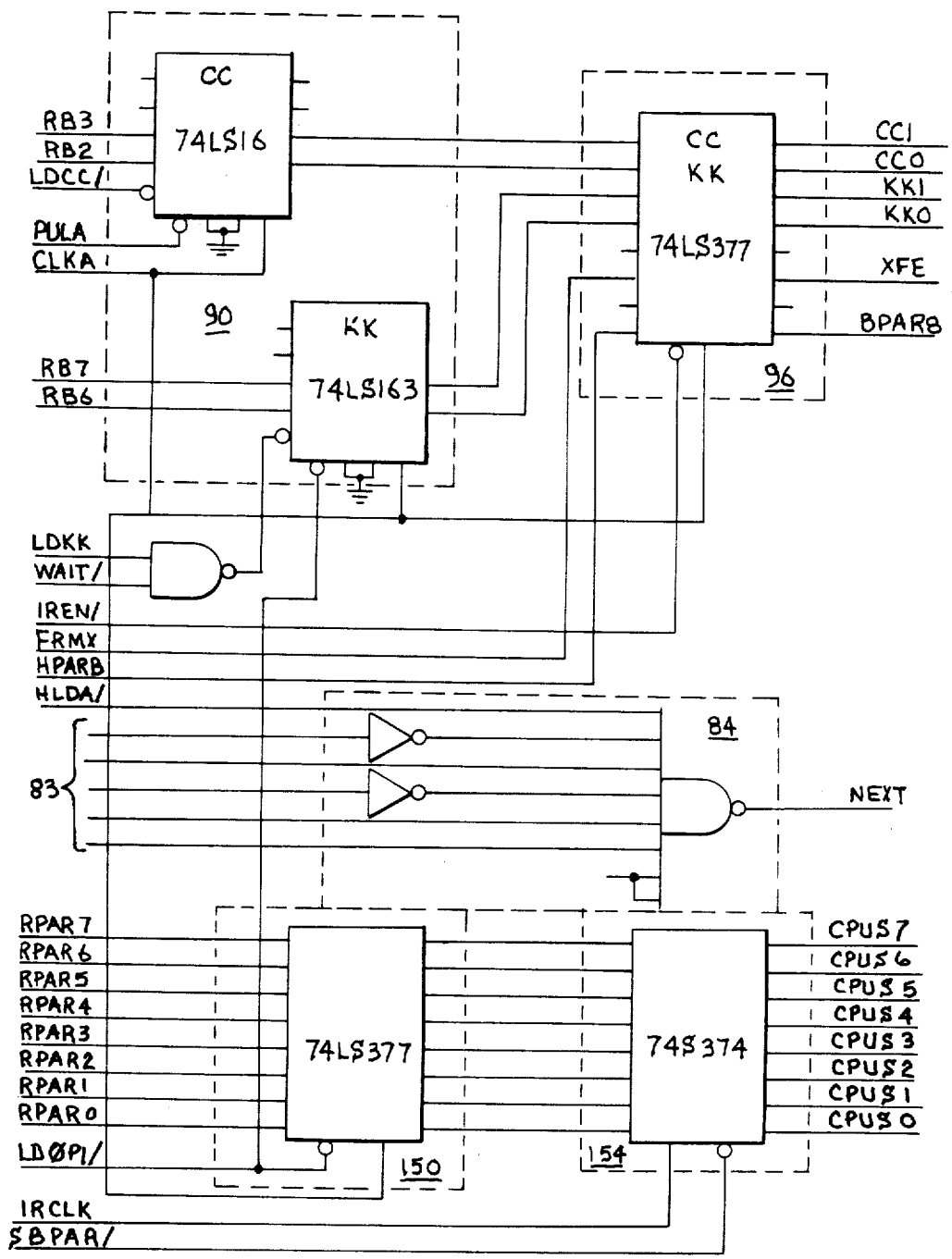

FIG. 5 shows portions of block 90, block 96, block 84, block 150 and block 154. Block 90 in this figure corresponds to the first rank instruction registers for CC and KK. The inputs to these blocks have already been discussed. That portion of block 96 shown in this figure is the second rank instruction register for CC and KK which is also used for the control terms XFG and BPAR. Block 84 is the NEXT select logic having as its inputs the ALU command bits over line 83 and its output the NEXT command. Block 150 is the H PAR register, which is a program counter latch. Its inputs are the various RNI program address register input lines RPAR 7–0, and the load first rank OP register command line LDOP1/. The final block in FIG. 5 is the 154 block which is the BPAR register which has as its output the lower 8 bits of the CPU source bus, CPUS 7–0.

Figure 6:
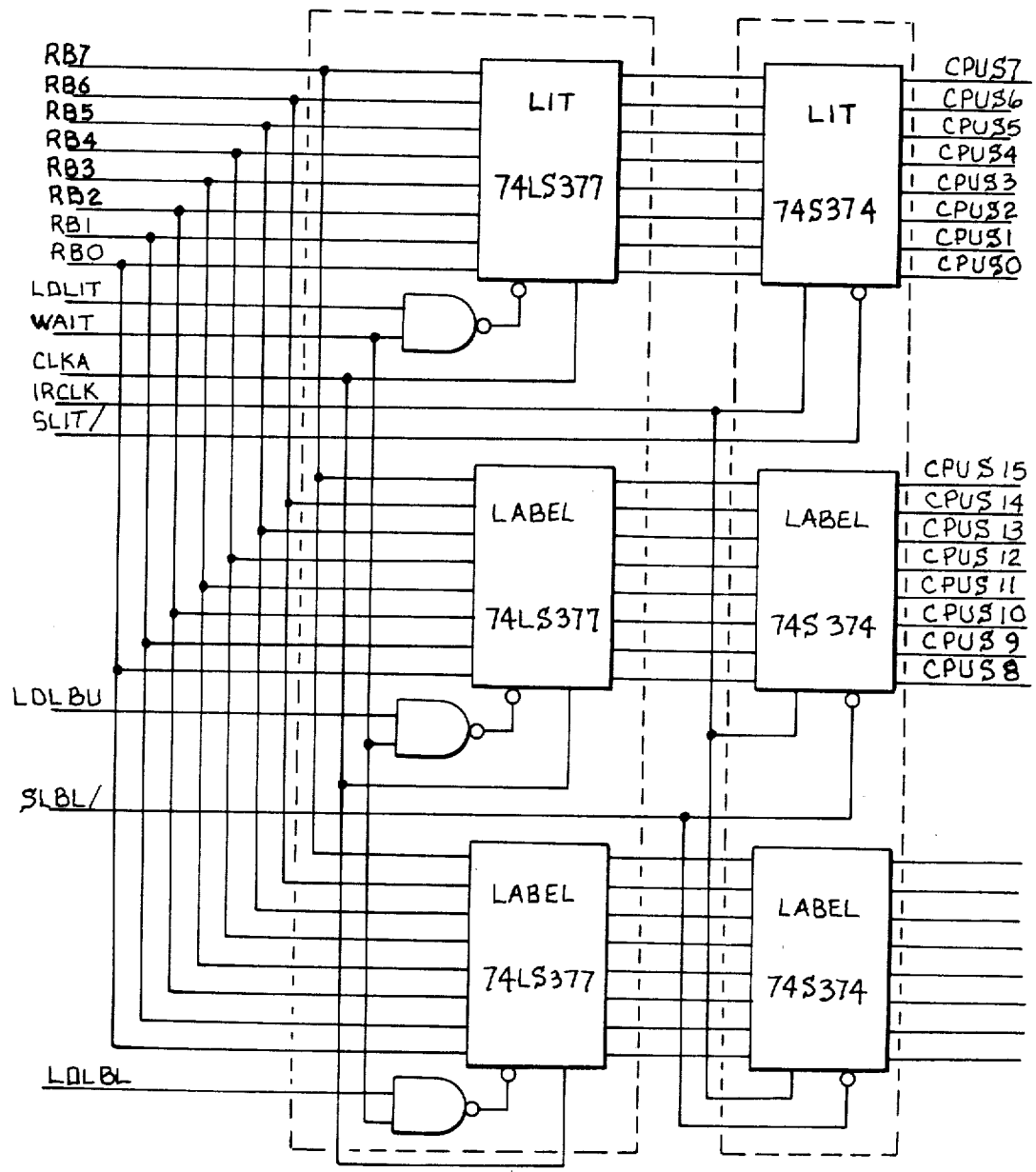

FIG. 6 shows blocks 92 and 98 which are the first and second rank literal and label registers. The inputs to this figure are the various RNI bus lines RB 7–0 load enable lines for the three registers, LDLIT, LDLBU and LDLBL, the various output enable signals SLIT and SLBL, and clock lines CLKA and IRCLK. The top two chips are the first and second rank literal registers, the middle two chips are the first and second rank upper label registers and the bottom two chips are the first and second rank lower registers. The output of this figure goes to the lower 16 bits of the CPU source bus, CPUS 15–0.

Figure 7:
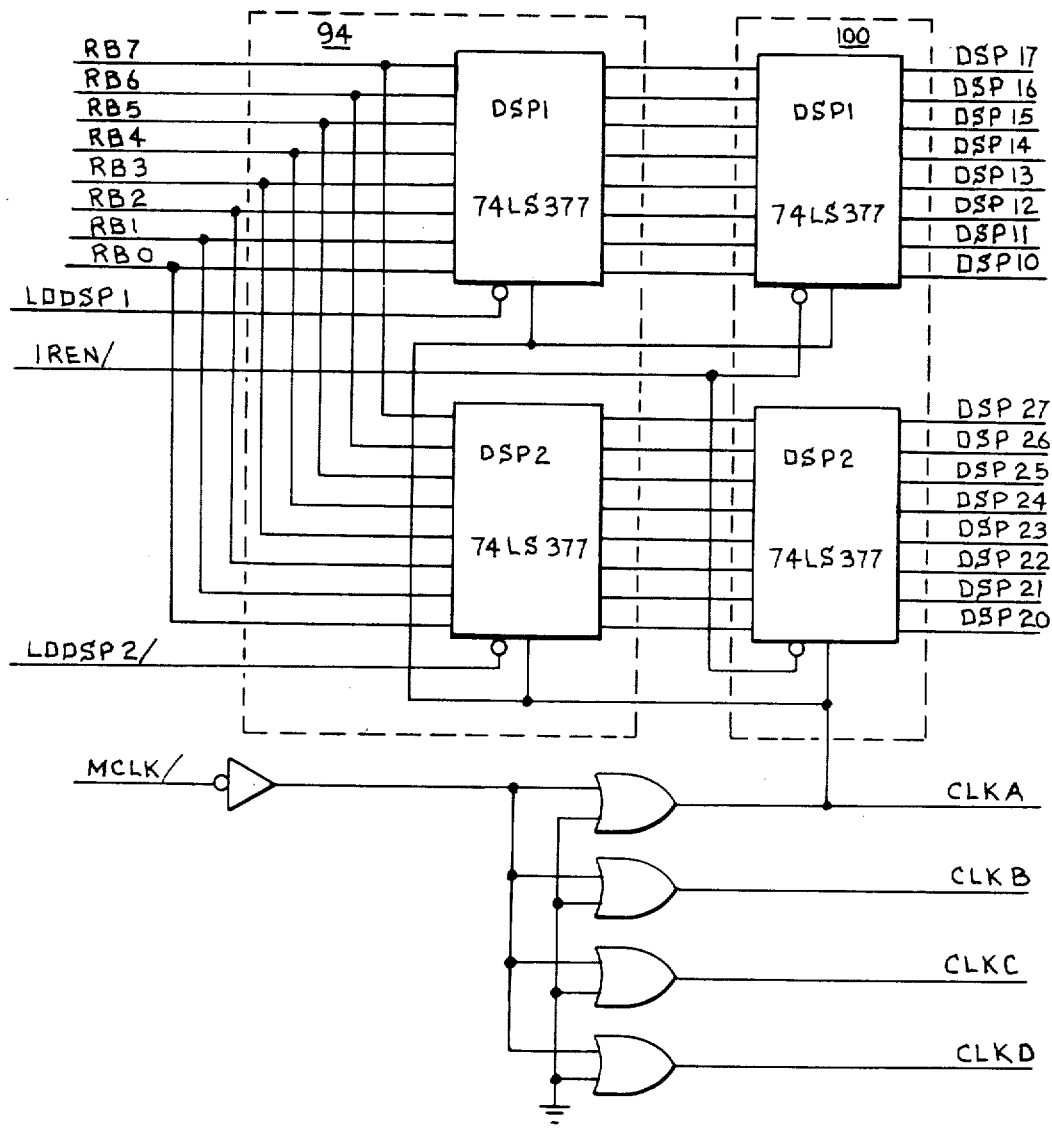

FIG. 7 blocks 94 and 100 which are the first and second rank instruction registers for DSP1 and DSP2. The RB 7–0 lines have already been discussed. The LDDSP1 line is a load enable line for the first rank instruction register for DSB1. The IREN line is the second rank instruction register load enable line. The LDDSB2 line is the load enable line for the first rank DSP2 register. The output lines for these blocks are the lines having the DSP1 or 2 prefix which feed into the address computation circuits, not shown. Shown below the blocks in this figure is the clock driver logic which has as its input the master clock input MCLK and the four output clock lines CLK A, B, C and D.

Figure 8:
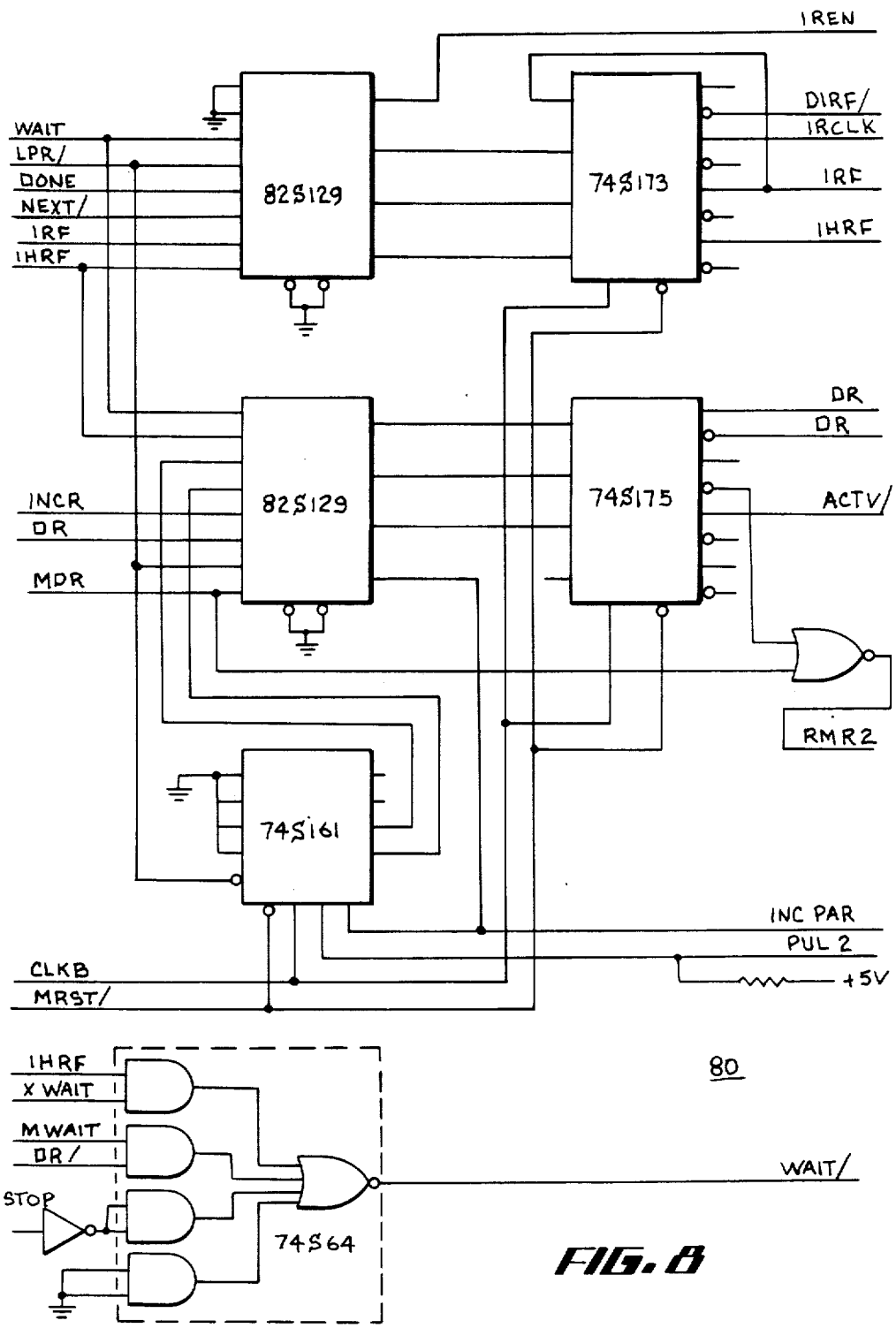

FIG. 8 shows the detailed schematic diagrams for the RNI state machine shown as block 80 on FIG. 1. This is the RNI fetch and instruction register control which controls all of the sequences in the RNI system. The various input and output lines to this figure have already been discussed. The bottom 74S64 chip is the WAIT command decoder.

Figure 9:
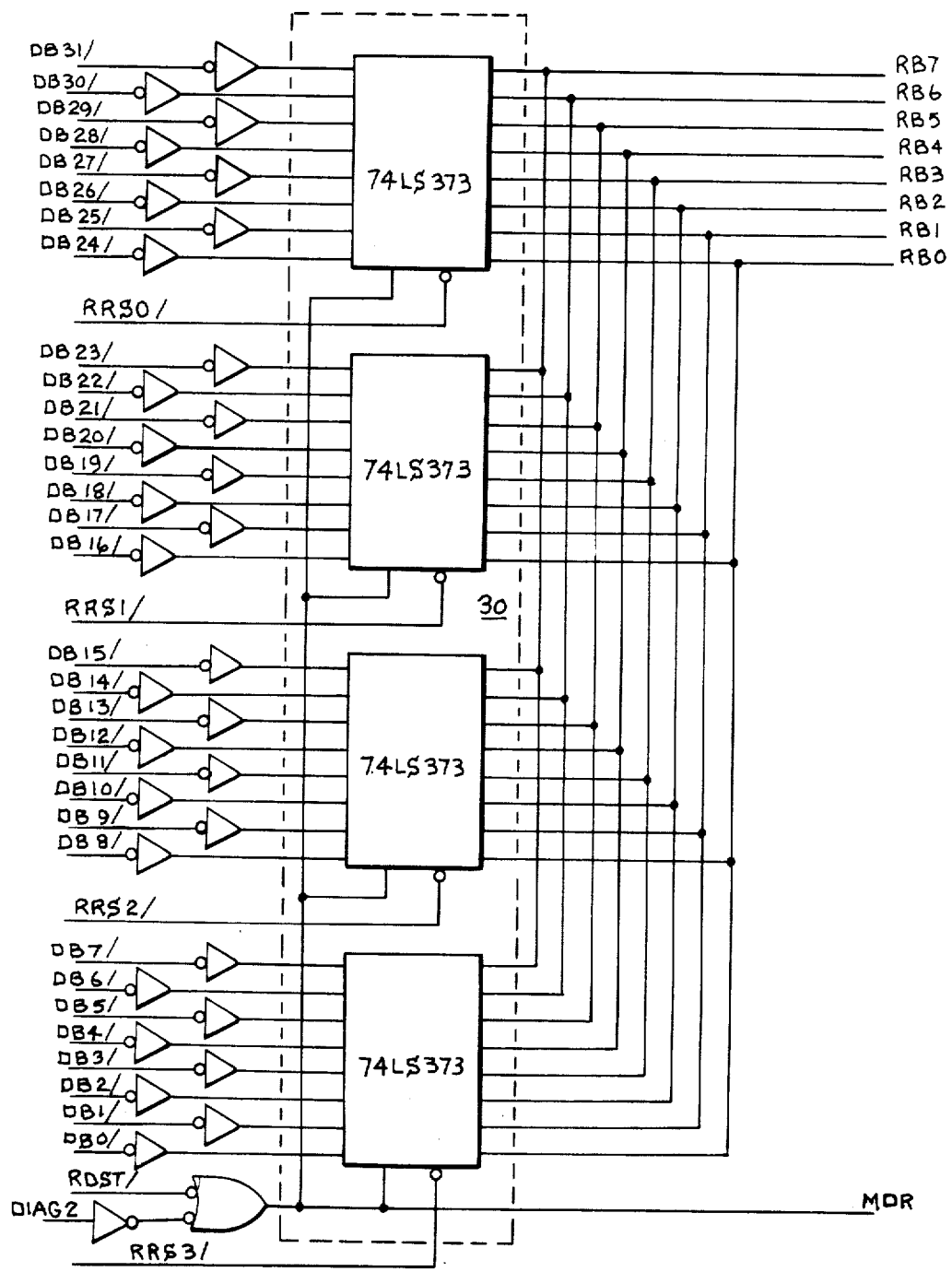

FIG. 9 shows the detailed schematics for the RNI memory data register shown as block 30 in FIG. 1. The four chips in this figure are from top to bottom for byte 3, byte 2, byte 1 and byte 0. The inputs are the various lines from the computer system data bus, lines DB 31–0. The various RRS lines are the individual byte enable lines output from the instruction byte selection block 144 shown in FIG. 1. The output lines for this figure are the read next instruction bus lines, RB 7–0.

Figure 10:
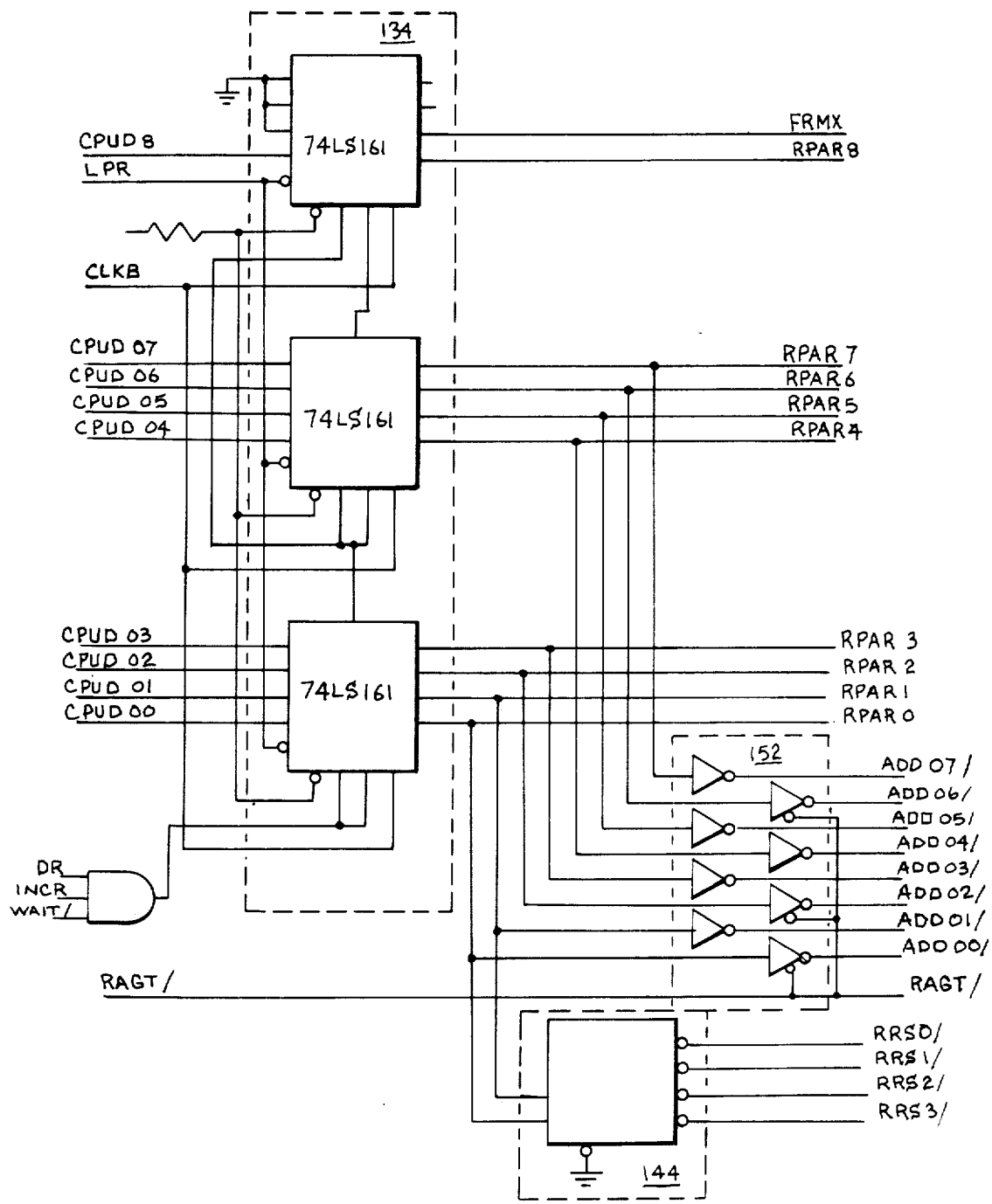

FIG. 10 shows the detailed schematics for block 134, block 152 and block 144. The lower program address register block 134 has as its inputs the CPU destination bus lines, CPUD 8–0 as well as load enable line LPR. The outputs of this block are the various RPAR lines 8–0 and control line FRMX. Block 152 contains the memory address bus drivers which output over lines ADD 07–00. Block 144 contains the program address register decoder for the memory data register byte select operation. It decodes the bits on the CPUD 01 and 00 lines to output the byte selection lines RRS 0–3.

Figure 11:
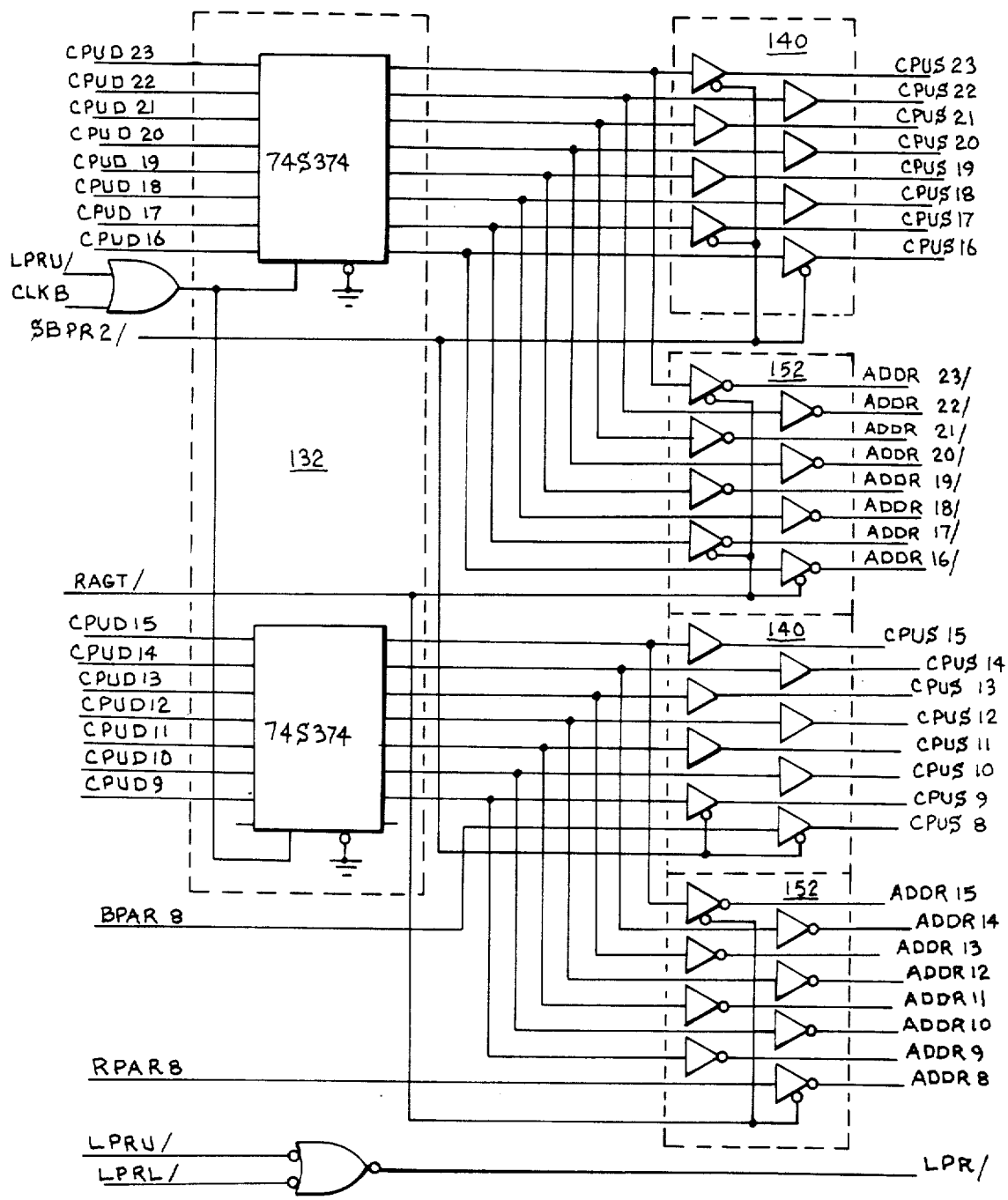

FIG. 11 shows the detailed schematic drawings for block 132 and portions of blocks 140 and 152. The 132 block is the upper program address register which has as its inputs the upper bits of the CPU destination bus, lines CPUD 23–09. Other inputs include the load program address register upper line LPRU and the clock line CLKB. As was discussed above, these upper bits are not handled by the RNI system and are passed directly on to the CPU source bus through the various drivers on to lines CPUS 23–9. The drivers for the CPU source bus lines are shown in blocks 140. These same upper program address register outputs are also driven on to the memory address bus lines ADDR 23–08 by the drivers in blocks 152.

Figure 12:
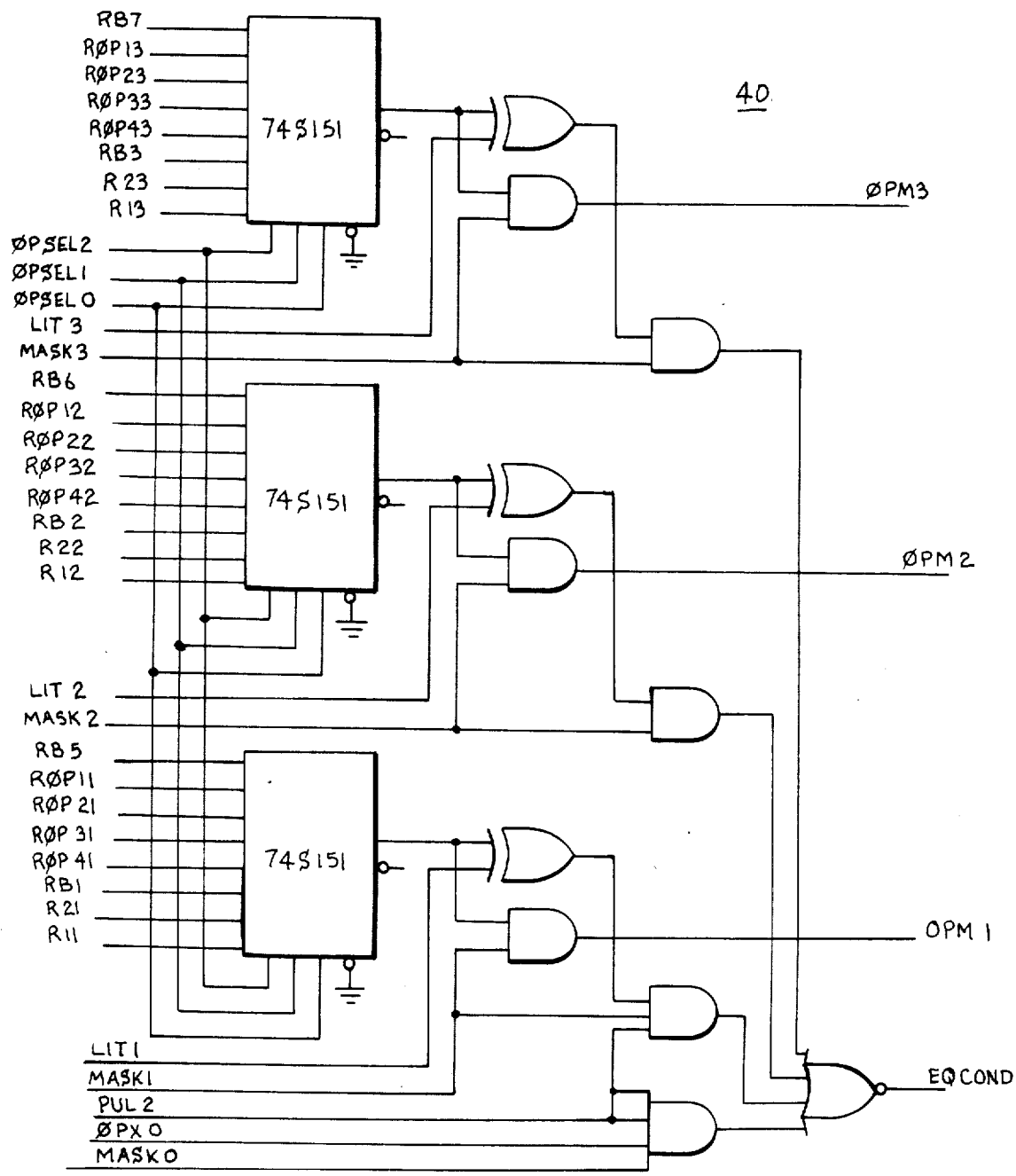

FIG. 12 shows the detailed schematics for a portion of the number 40 block shown in FIG. 1. This is the block which controls the OP register selection and use by RNI picoprocessors to control its parsing operations. The three chips on the left (74S151's) are the multiplexer chips which have as their inputs the various R, ROP, RB, and OPSEL lines as shown. The output from these multiplexers goes into the various decoding logic gates shown to the right of the 74S151 chips in conjunction with the LIT and MASK input lines plus the PUL2 and OPX0 lines as shown. The output from block 40 is the various OPM 3–1 lines which describe the selected OP register terms used for picoprocessor branching operations. The EQCOND output line is the RNI picoprocessor conditional branch test condition line.

Figure 13:
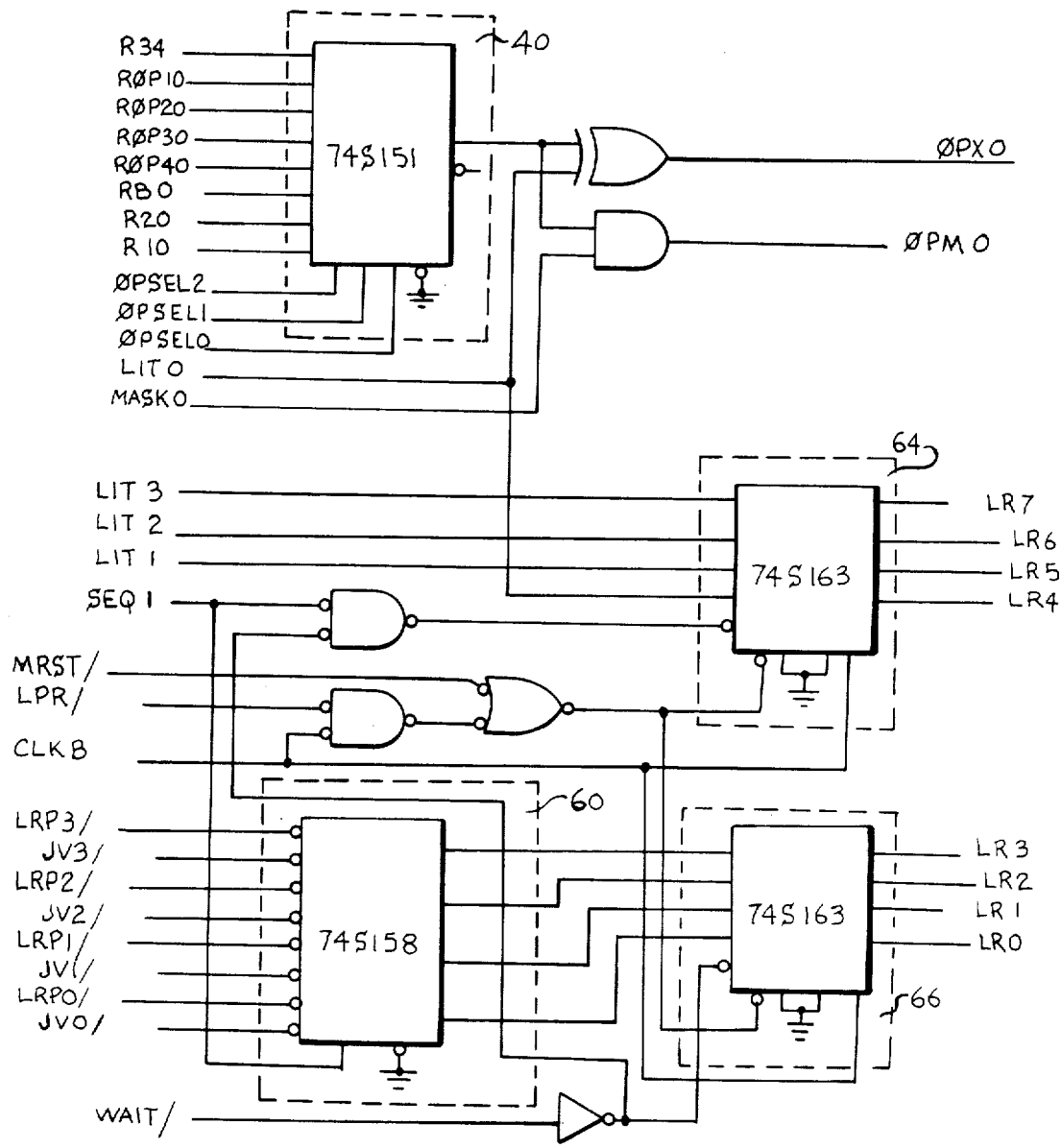

FIG. 13 shows another portion of the 40 block shown in FIG. 1 as well as block 60, block 64, and block 66. The portion of the 40 block is very similar to the portion shown in FIG. 12 with the output from this block being the OPX0 and OPM0 lines. The 60 block is part of the picoprocessor branch selection multiplexer. The MRST input line is the system master reset line, and the various JV prefixed lines are the picoprocessor firmware word addresses for the jump vectors. The LRP prefixed input lines are the picoprocessor conditional branch test condition lines. Blocks 64 and 66 are the two portions of the picoprocessor program address register called the L register. It has as its outputs the various picoprocessor firmware address bit lines, LR 7–0.

Figure 14:
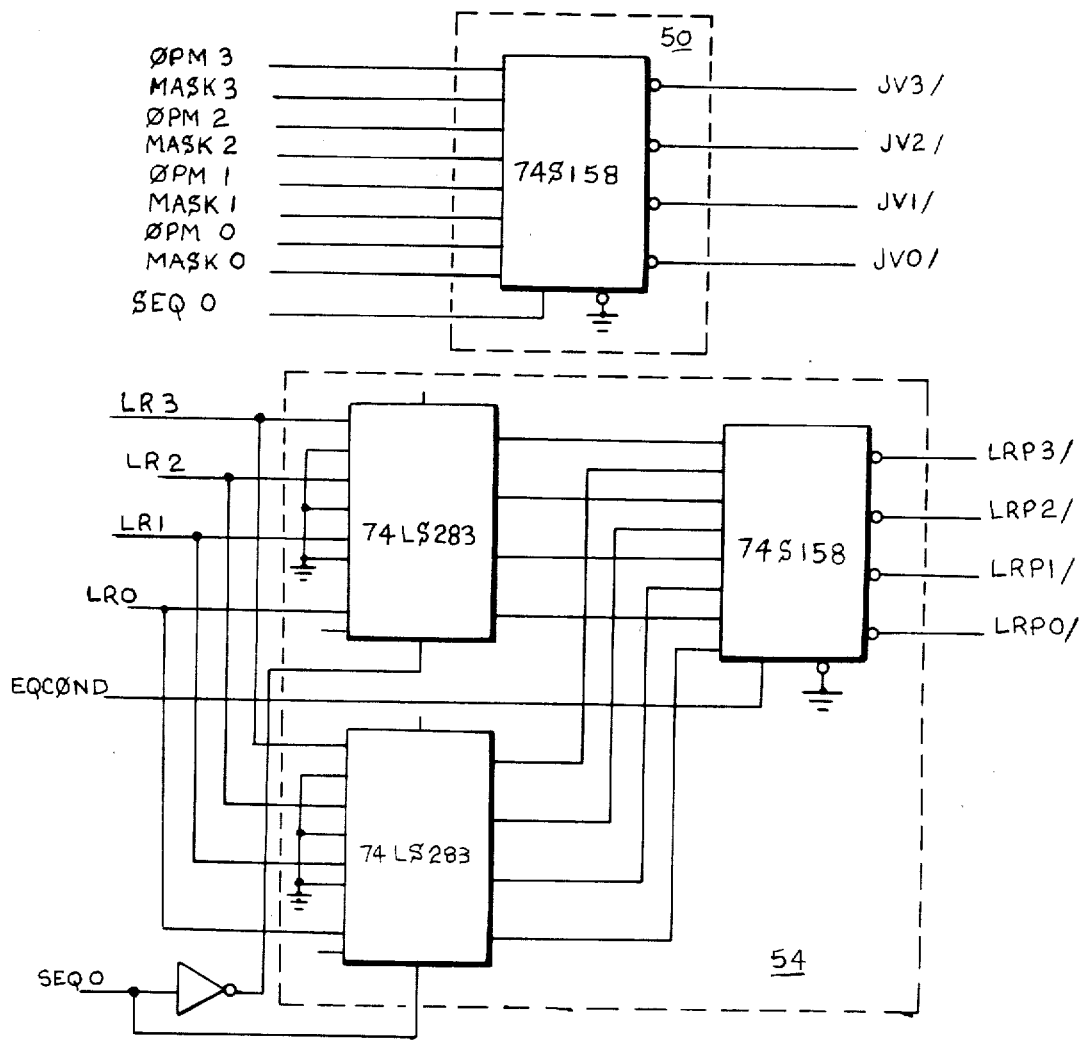

FIG. 14 shows block 50 and block 54 from FIG. 1. Block 50 is the jump vector selection logic block with inputs and outputs which have already been described. The two 74LS283 chips in the 54 block are the next address incrementor for the picoprocessor and control the conditional branch and LRP selection. The 74S158 chip is part of the picoprocessor branch selection multiplexer. The inputs and outputs to these chips have already been described.

Figure 15:
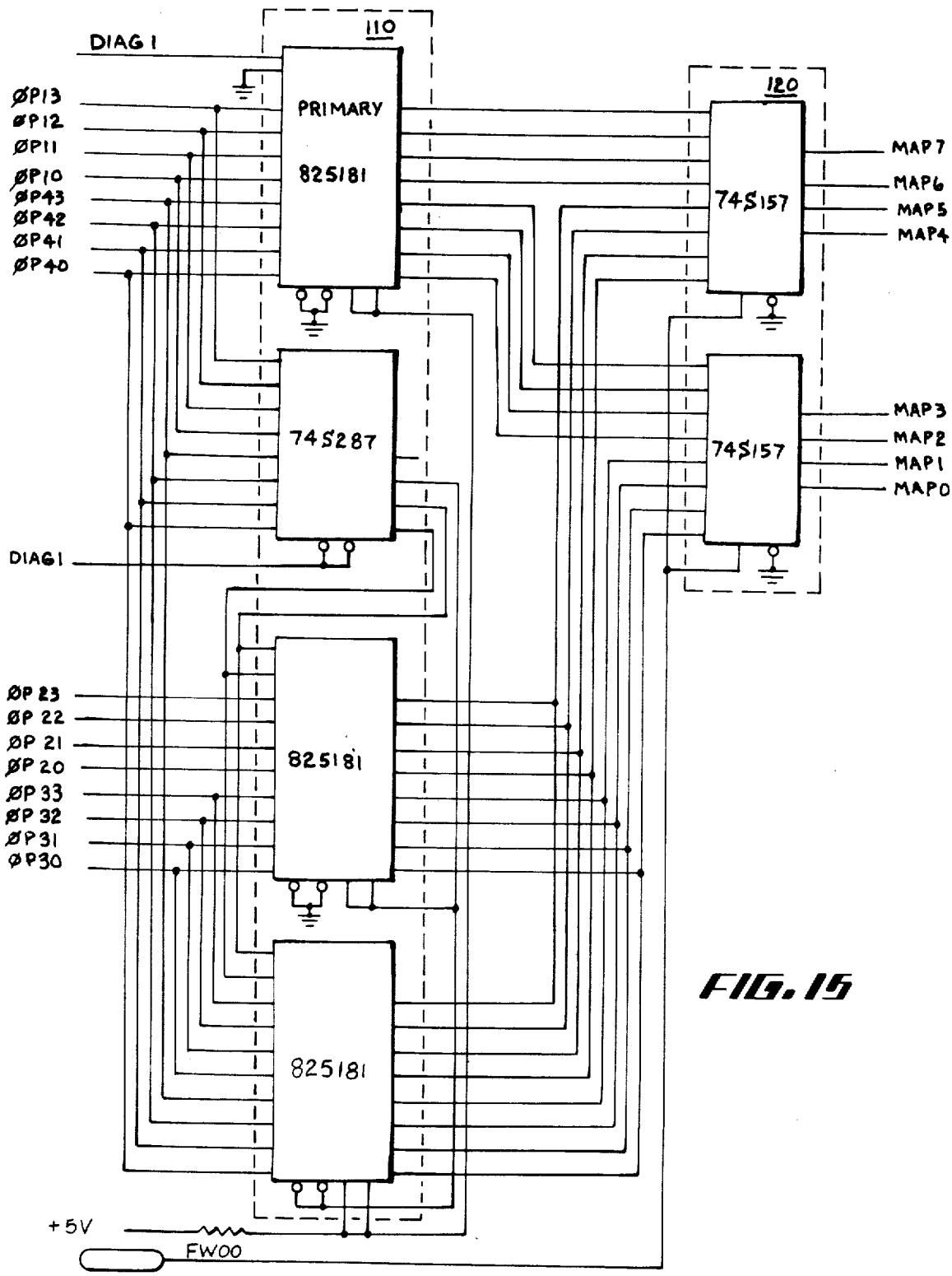

FIG. 15 shows the detailed schematics for blocks 110 and 120 in FIG. 1. The upper most 82S181 chip in the 110 block is the primary map branch ROM. The 74S287 chip is the secondary map branch enable ROM. The lower two 82S181 chips are the secondary map branch ROM's. The inputs into these chips are the various OP prefixed lines which originate in the second rank instruction registers for OP1, 2, 3 and 4. The output from block 110 feeds into block 120 which is the primary or secondary map branch selection logic. These two chips have as their outputs the eight MAP lines. Line FW00 is a function select bit used in the main firmware word for the overall system control of the memory operations for the CPU.

The following instruction example is presented to illustrate the functions of the RNI system in conjunction with the ALU and the address computation subsystem. The example presented is the processing of one software instruction, the subtract and branch instruction BDZ in the SEQUEL software set. This particular instruction is 6 bytes in length. The instruction coding is:

| BYTE 1 | BYTE 2 | BYTE 3 | BYTE 4 | BYTE 5 | BYTE 6 |
|--------|--------|--------|--------|--------|--------|
| F R1   | DSPL1  | KK01 R2 | DSPL 2 | 7CC   | Branch Address |

This instruction causes the CPU to do the following functions: Two data values are fetched from memory; B value is subtracted from A, and the result is stored in location A. Data A is stored at the address described by R1 and DSPL1 while Data B is stored at the location described by R2 and DSPL2. The result is tested for a conditional branch. If the condition is met, the program branches to the branch location specified in bytes 5 and 6. (The branch address overlaps into the last 2 bits of byte number 5 as well as occupying all of byte number 6.) If the condition is not met, the program advances to the next location.

Data locations are specified in the instruction by $R_1$ and $R_2$ and DSPL1 and DSPL2. R1 or 2 is a 4-bit pointer to one of 16 registers which contains an address of a memory frame. DSPL is a displacement within the frame to the location of the particular operand. The data address is generated by the address computation sytem which combines the value in the register designated by the R with the displacement and adds a constant, if necessary. Since there are two data locations in this particular instruction, two separate address computations are required. The data word length is specified by KK. It can be 1, 2, 4, or 6 bytes in length. The same word length applies to both variables. In the example the word length is 4, There are four branch types which are specified by CC. The branch address is 10 bits in length.

The instruction is identified to the RNI system hardware and to the CPU by its primary and secondary OP codes. The primary OP code is the "F". The secondary OP code is found in two locations, the 0 1 binary number in byte 3 and the 7 located in byte 5. This OP code information is used by the RNI system for parsing and by the CPU for MAP branching. Since the secondary OP code value exceeds 4 bits, it is necessary to do a primary map branch, followed by a secondary map branch. The RNI sytem parses the information in this instruction into its hardware instruction registers as shown in the following table:

TABLE 2

RNI PARSING TABLE FOR BDZ

| INSTRUCTION BYTE NUMBER | ITEM | RNI REGISTER | BIT LENGTH | USE BY THE CPU |
| --- | --- | --- | --- | --- |
| 1 | OP Code F | OP 1 | 4 | PRIMARY MAP BRANCH |
|   | R1 | R1 | 4 | ADDRESS COMPUTATION |
| 2 | DSP1 | DSP1 | 8 | ADDRESS COMPUTATION |
| 3 | KK | KK | 2 | ADDRESS COMPUTATION |
|   |    |    |   | CPU BRANCH CONDITION |
|   |    |    |   | CPU DATA ROTATE |
|   | KK01 | OP 4 | 4 | PRIMARY MAP BRANCH |
|   | R2 | R2 | 4 | ADDRESS COMPUTATION |
| 4 | DSP2 | DSP2 | 8 | ADDRESS COMPUTATION |
| 5 | 7 | OP 2 | 4 | SECONDARY MAP BRANCH |
|   | CC | CC | 2 | CPU BRANCH CONDITION |
| 5 | BRANCH | LABEL | 10 | CPU DATA SOURCE TO |
| / | ADDRESS |   |   | DETERMINE SOFTWARE |
| 6 |   |   |   | BRANCH ADDRESS |

Assuming that this instruction (BDZ) is the first instruction to be executed by the CPU, the sequence of steps is described in a simplified form as follows:

1. CPU loads the RNI program address register with the software address and waits for RNI to fetch and parse.
2. RNI initiates an instruction fetch memory and waits for the memory cycle to complete.
3. RNI parses the first 4 bytes of the instruction in sequence.
4. RNI initiates a second instruction fetch memory cycle and waits for the memory cycle to complete.
5. RNI parses the last two bytes of the instruction.
6. RNI loads the second rank instruction register and sends the instruction ready status to the CPU. At this point, RNI begins to parse the next instruction in a background mode.
7. The CPU does a primary and secondary map branch to get to the firmware routine for processing the BDZ instruction.
8. The CPU does an address computation and memory read of the first data value.
9. The CPU then does testing for attach and frame error, and address computation for the second value. It then initiates a memory read for the second data value.
10. The CPU then rotates the first data value and inputs it into the ALU.
11. The CPU rotates the second data value and subtracts it from the first data value which is in the ALU. At the same time it starts a memory write cycle to store the result. The value to be stored is rotated on the next firmware cycle so that it is written by the memory cycle.
12. The CPU updates the condition flags.
13. The CPU then tests for a branch according to CC (1 0 in this case). If the condition is met, the CPU inputs the branch value from the RNI label register and loads it into the RNI program address register. The cycle then starts over again as it did in step 1. If the condition is not met, the CPU issues a NEXT command to RNI. By this time, RNI is most likely through parsing the next instruction, so it immediately loads the second rank instruction register with the NEXT instruction, and the CPU can start on it immediately.

What is claimed is:

1. A read next instruction system (RNI) for use in fetching and parsing instruction strings to an Arithmetic Logic Unit (ALU) in a computer system having a CPU proiding computer system control commands, an I/O and memory address bus, an I/O and memory data bus and an ALU source bus and an ALU destination bus wherein the source and destination buses respectively provide all information to and accept all information from the ALU itself such that necessary information to make RNI decisions by the ALU is provided to the ALU over the ALU source bus and ALU output comprising information for the RNI system is conveyed to it over the destination bus, the RNI system comprising:

input means to supply instruction strings to the RNI system from the I/O and memory data bus of the computer system comprising memory data read register means loaded from the I/O and memory data bus and controlled by instruction byte selector means, the selector means being responsive to command information from an RNI picoprocessor means and to an RNI memory data strobe signal from the computer system to input sequentially single bytes of an instruction string into the memory data read register means of the RNI system;

RNI picoprocessor means comprising jump vector and conditional brach logic means, picoprocessor register means, and control store means to provide command information to parse the input bytes from the memory data read register means into different registers in a first rank instruction register means and provide RNI system picoprocessor control commands;

RNI state controller means comprising ROM and latches means responsive to the status of the various picoprocessor control commands and computer system control commands and providing RNI system state controller command signals;

first rank instruction register means comprising a plurality of register means to hold the parsed instruction string, individual registers in the first rank instruction register means being loaded from the input means under the control of command signals from the picoprocessor means and the state controller means;

second rank instruciton register means comprising a plurality of register means to hold the parsed instruction string, individual registers in the second rank register means being loaded from corresponding individual registers in the first rank register instruction means under the control of command signals from the picoprocessor means and the state controller means; and output means to supply the parsed instruction string from the second rank instruction register means to the ALU over the ALU source bus for processing by the ALU.

2. The RNI system of claim 1 further comprising program address register means supplied with address information from the ALU destination bus of the computer system, first rank address register means and the I/O and memory address bus of the computer system being supplied from the program address register means, and second rank program address register means supplied from the first rank program address register means, the output of the second rank address register means being supplied to the ALU source bus of the computer system.

3. The system of claim 1 wherein the individual registers in the first rank register means comprise OP code register means, address register means, and displacement register means.

* * * * *